United States Patent
Zhang et al.

(10) Patent No.: US 8,325,852 B2
(45) Date of Patent: Dec. 4, 2012

(54) CDD PRECODING FOR OPEN LOOP SU MIMO

(75) Inventors: Jianzhong Zhang, Irving, TX (US); Cornelius Van Rensburg, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1224 days.

(21) Appl. No.: 12/155,097

(22) Filed: May 29, 2008

(65) Prior Publication Data
US 2008/0303701 A1    Dec. 11, 2008

Related U.S. Application Data

(60) Provisional application No. 60/929,027, filed on Jun. 8, 2007, provisional application No. 60/929,455, filed on Jun. 28, 2007.

(51) Int. Cl.
*H04L 27/00* (2006.01)
*H04L 25/49* (2006.01)
*H03C 7/04* (2006.01)

(52) U.S. Cl. .................. 375/299; 375/296; 455/101

(58) Field of Classification Search .................. 375/259, 375/260, 267, 295, 298, 299, 261, 377, 296, 375/297; 370/203, 206, 208; 455/99, 101
See application file for complete search history.

(56) References Cited

U.S. PATENT DOCUMENTS

| | | |
|---|---|---|
| 2005/0259567 A1 | 11/2005 | Webster et al. |
| 2006/0193245 A1 | 8/2006 | Aghvami et al. |
| 2007/0041457 A1 | 2/2007 | Kadous et al. |
| 2007/0274411 A1* | 11/2007 | Lee et al. ............ 375/267 |
| 2008/0144733 A1* | 6/2008 | ElGamal et al. ........ 375/267 |
| 2008/0192849 A1* | 8/2008 | Kim et al. ............ 375/260 |
| 2008/0192856 A1* | 8/2008 | Jongren et al. ......... 375/267 |
| 2008/0247364 A1* | 10/2008 | Kim et al. ............ 370/336 |
| 2008/0292013 A1* | 11/2008 | Varadarajan et al. .... 375/260 |
| 2010/0027697 A1* | 2/2010 | Malladi et al. ........ 375/260 |
| 2010/0046650 A1* | 2/2010 | Jongren et al. ......... 375/260 |
| 2010/0103832 A1* | 4/2010 | Zhou et al. ............ 370/252 |

OTHER PUBLICATIONS

International Search Report dated on Nov. 27, 2008 in corresponding International Application No. PCT/KR2008/003212.
3GPP RAN1 contribution R1-072461, "High Delay CDD in Rank Adapted Spatial Multiplexing Mode for LTE DL", May 2007, Kobe, Japan.
3GPP RAN1 contribution R1-072019 "CDD precoding for 4 Tx antennas", May 2007, Kobe, Japan.
3GPP RAN1 contribution R1-072633 "Updated TS36.211 v1.1.0", May 2007, Kobe, Japan.
3GPP TS 36.211 v1.0.0 Mar. 2007, "3rd Generation Partnership Project; Technical Specification Group Radio Access Network; Physical Channels and Modulation"; Release 8; 30 pages.

* cited by examiner

*Primary Examiner* — Tesfaldet Bocure

(57) ABSTRACT

A method for data transmission is provided that includes selecting a codeword from a predetermined codebook based on a transmission rank, generating a precoding matrix based on the selected codeword, precoding a plurality of symbols with the precoding matrix, and transmitting the precoded symbols.

20 Claims, 11 Drawing Sheets

TRANSMITTER

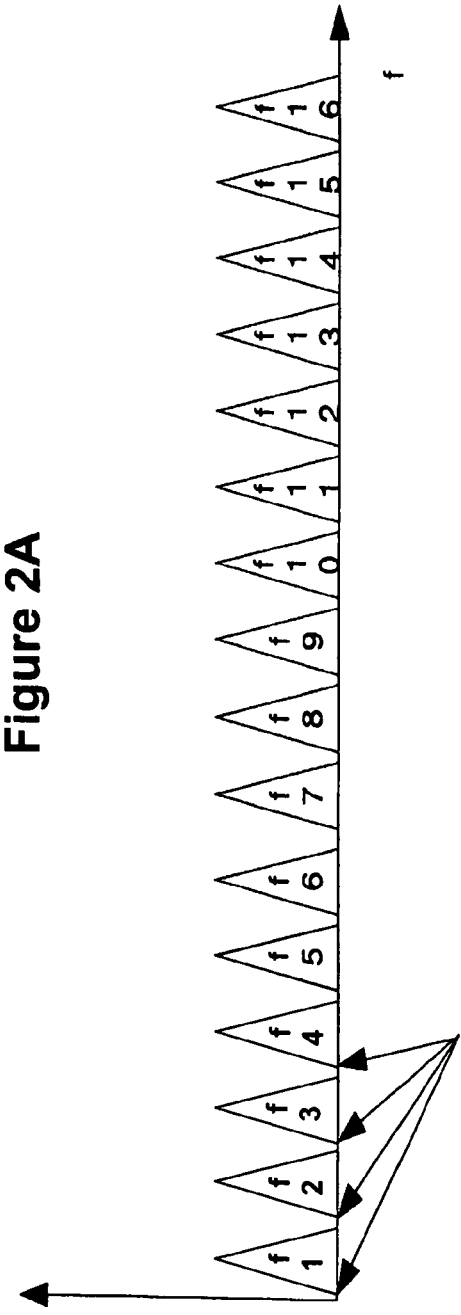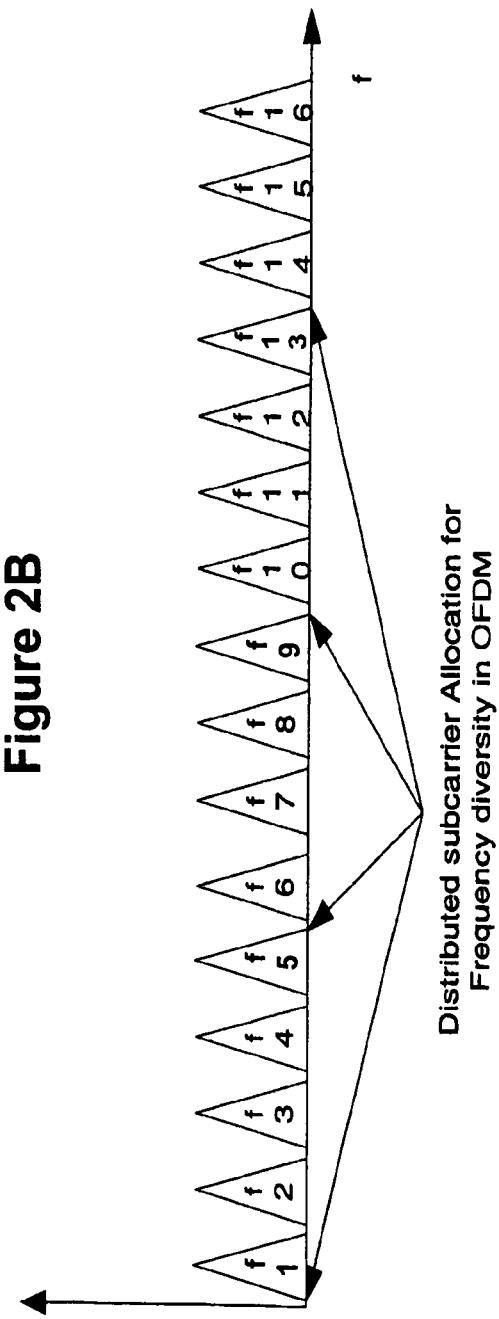

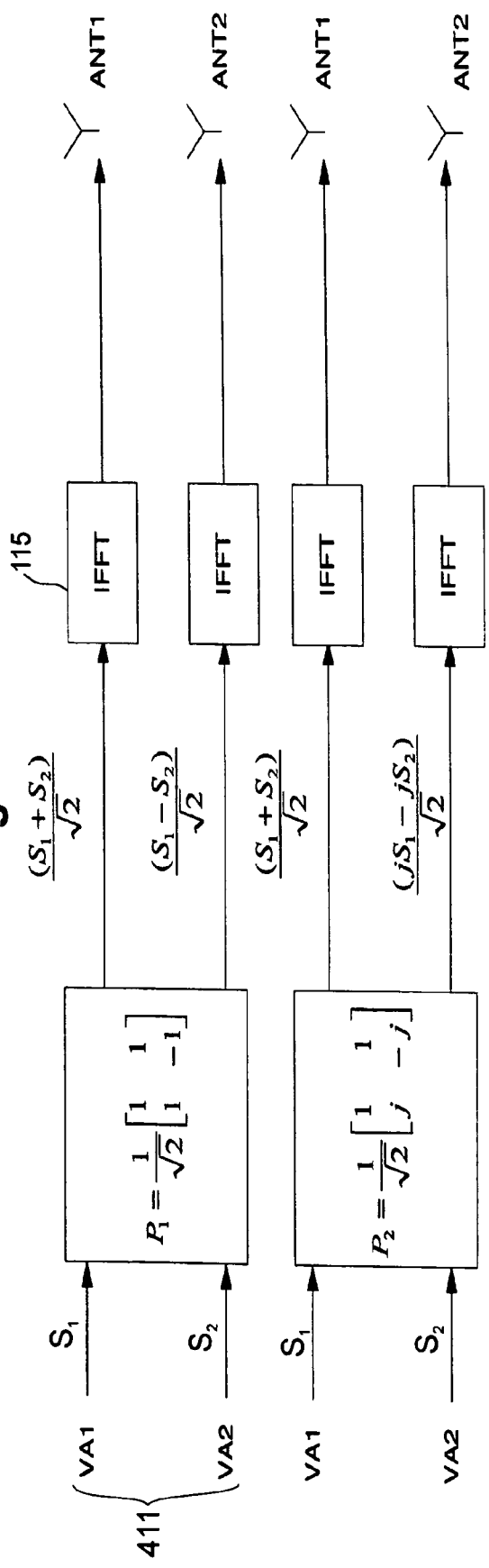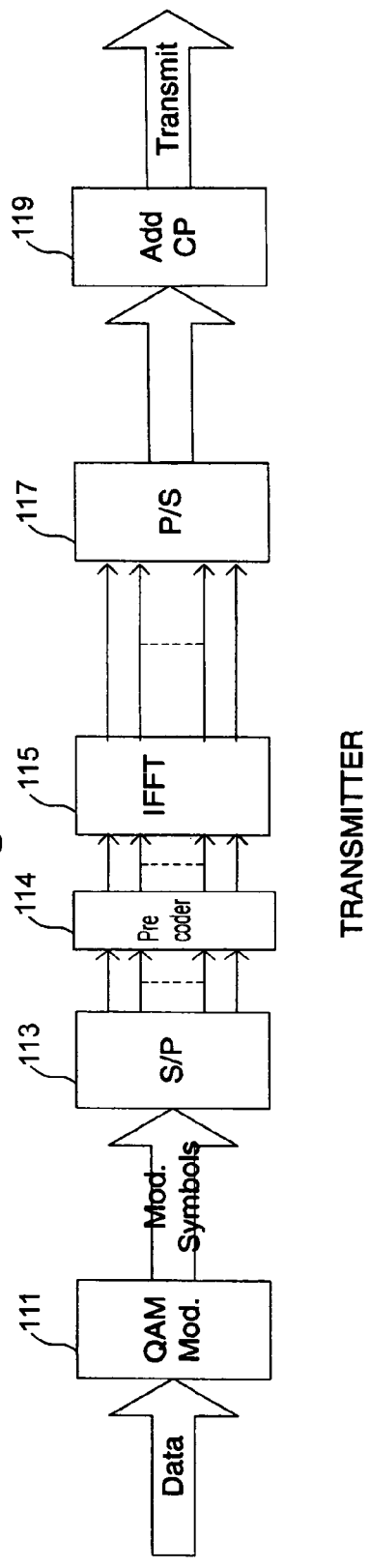

CDD PRECODING FOR OPEN LOOP SU MIMO

CLAIM OF PRIORITY

This application makes reference to, incorporates the same herein, and claims all benefits accruing under 35 U.S.C. §119 from applications earlier filed in the U.S. Patent & Trademark Office on 8 Jun. 2007 and there duly assigned Ser. No. 60/929,027, and on 28 Jun. 2007 and there duly assigned Ser. No. 60/929,455, respectively.

BACKGROUND OF THE INVENTION

1. Field of the Invention

The present invention relates to a method and to a circuit for transmitting data in a communication system, and more specifically, to more reliable and efficient methods and circuits for selecting precoding matrix for the open-loop structures.

2. Description of the Related Art

Orthogonal Frequency Division Multiplexing (OFDM) is a popular wireless communication technology used to multiplex data in the frequency. The total bandwidth in an OFDM system is divided into narrowband frequency units called subcarriers. In frequency-selective multi-user scheduling, a contiguous set of subcarriers potentially experiencing upfade distortion is allocated for transmission to a user. In frequency-diversity transmission, however, the allocated subcarriers are preferably uniformly distributed over the whole spectrum.

In a wireless mobile system employing OFDM based access, the overall system performance and efficiency can be improved by using, in addition to time-domain scheduling, frequency-selective multi-user scheduling. In a time-varying frequency-selective mobile wireless channel, it is also possible to improve the reliability of the channel by spreading and/or coding the information over the subcarriers.

A multiple antenna communication system, which is often referred to as a multiple input multiple output (MIMO) system, is widely used in combination with OFDM technology, in a wireless communication system to improve system performance. MIMO schemes use multiple transmitting antennas and multiple receiving antennas to improve the capacity and reliability of a wireless communication channel.

A popular MIMO scheme is MIMO precoding. With precoding, the data streams to be transmitted are precoded, i.e., pre-multiplied by a precoding matrix, before being passed on to the multiple transmitting antennas in a transmitter. In a pre-coded MIMO system, inverse operations are performed at the receiver to recover the transmitted symbols. The received symbols are multiplied with the inverse precoding matrices.

Recent efforts of the precoding approach were applied to both transmit diversity and MIMO spatial multiplexing. A composite precoder is constructed based on a unitary precoder such as Fourier matrix precoder multiplied with another unitary precoder representing a transmit diversity scheme such as Cyclic Delay Diversity (CDD). It should be noted that the principles of the current disclosure also apply to the cases of non-unitary precoding or unitary precoders other than Fourier matrix precoder. Matrix D is introduced as a symbol for a CDD precoding matrix and Matrix P is introduced as a symbol for a Discrete Fourier transform (DFT) matrix, then the combined matrix C=DP becomes a column permutation on alternative subcarriers. Efforts have been made to improve precoding methods in both of open loop structures and closed loop structures in following 3rd Generation Partnership Project (3GPP TM) documents:

3GPP RAN1 contribution R1-072461, "High Delay CDD in Rank Adapted Spatial Multiplexing Mode for LTE DL", May 2007, Kobe, Japan;

3GPP RAN1 contribution R1-072019, "CDD precoding for 4 Tx antennas", May 2007, Kobe, Japan;

3GPP RAN1 contribution R1-072633, "Updated T536.211 v1.1.0", May 2007, Kobe, Japan; and 3 GPP 36211-110: "3 GPP TS 36.211 v1.0.0 3rd Generation Partnership Project; Technical Specification Group Radio Access Network; Physical Channels and Modulation Release 8", March 2007.

In an alternative preceding CDD structure, a large-delay CDD is applied in conjunction with the precoding matric, if a feedback of Precoding Matrix Indication (PMI) is available. For Large-delay CDD with PMI feedback, the codebook shall be selected from the Single User MIMO (SU-MIMO) codebook or a subset thereof. For large-delay CDD, preceding for spatial multiplexing shall be done according to the following equation:

$$y(k)=W(k)QD(k)Ps(k), \quad (1)$$

where the preceding matrix W(k) is the channel-dependent default precoding (sub)matrix which is selected from a codebook of size Nt×p. Note that k is the subcarrier index, Nt is the number of antenna ports in transmitter and p is the transmission rank. The matrices P, and D(k) are of size p×p, while W(k) is Nt×p. The choice of Q can be of several different forms. Q=I where I is p×p identity matrix (in this case Q can be removed); or Q=P$^{-1}$ which is the inverse of P.

In the contemporary methods for obtaining W(k), it is assumed that the choice of W(k) is chosen according the PMI, which is obtained from uplink feedback. Once a PMI is obtained for a subband, the same choice of W(k) is applied throughout this subband. That is, W(k) stays the same within the same subband. However, in the high speed scenarios the PMI feedback is not reliable and the PMI in the feedback cannot be used. The high speed system may be defined as an open-loop system. It is therefore not clear how the precoder W(k) should be selected in an open-loop system. Furthermore, the prior methods have no solution for the cases where no PMI is available for the less than full rank case.

SUMMARY OF THE INVENTION

It is, therefore, an object of the present invention to provide an improved method and an improved circuit for high speed, open-loop precoding.

It is another object to provide reliable circuit and more reliable methods of selecting W(k) for high-speed open-loop precoding CDD, for various antenna correlation configurations.

In one embodiment of the current invention, the precoding matrix W(k) is selected according to a feedback without precoding matrix index (PMI) in the uplink for each given User Equipment (UE), and this feedback without precoding matrix index (PMI) is different from the dynamic PMI. The same W(k) is applied to the given UE across the scheduled subband. This method is especially useful in the configuration where the Node-B antennas are highly correlated. "Node-B" antenna contains transmitter(s) and receiver(s) employed for communicating directly with the mobile devices in a radio frequency.

The Selection of W(k) Based on SU-MIMO Codebook

In another embodiment of the current invention, the SU-MIMO codebook is denoted as $C_L(p)$, for a given transmission rank p that may be 1, 2, 3 or 4. The size of the codebook for rank p is denoted by $N_p$. The codewords $c_i(p)$ are denoted in codebook $C_U(p)=\{c_1(p), \ldots, c_{N_p}(p)\}$ $i=1, \ldots, N_p$. Note that $c_i(p)$ is a Nt×p matrix.

Furthermore, one way of selecting the precoding matrix W(k) for rank p is to cycle through the codebook $C_U(p)$ as k increases. There are two options of how fast the precoding matrix changes. In the first option, the precoding matrix W(k) changes every p subcarriers within the subband. In the second option, the precoding matrix W(k) changes every subcarrier within the subband.

In another embodiment of this invention, for each codebook $C_U(p)$, the subsets $C_{U,S}(p) \subset C_U(p)$ are defined, such that $C_{U,S}(p)=\{c_{s,1}(p), \ldots, c_{s,J_p}(p)\}$ while $J_p$ is the size of the subset ($J_p$ is less than or equal to $N_p$).

Furthermore, one way of selecting the precoding matrix for W(k) is to pick a subset $C_{U,S}(p)$ for a given rank p, and then cycle through this subset as k increases. There are two options of how fast the precoding matrix changes. In the first option, the precoding matrix W(k) changes every p subcarriers within the subband. In the second option, the precoding matrix W(k) changes every subcarrier within the subband.

In another embodiment of the invention, W(k) is selected as one of the submatrices in the set $C_U(p)$, for a given rank p. And the W(k) is fixed for all the subcarriers in the subband scheduled for the UE.

The Selection of W(k) Based on DFT Submatrix

In another embodiment of the current invention, a selection of W(k) is based on DFT submatrix. A 4Tx DFT matrix is defined as:

$$F = [f_1 \quad f_2 \quad f_3 \quad f_4] \quad (2)$$
$$= 0.5 * \begin{bmatrix} 1 & 1 & 1 & 1 \\ 1 & j & -1 & -j \\ 1 & -1 & 1 & -1 \\ 1 & -j & -1 & j \end{bmatrix},$$

where $f_i$, $i=1, \ldots, 4$ is the i'th column of the above DFT matrix. The set of rank dependent sub-matrices $C_F(p)$ is dependent on the transmission rank p:

$$C_F(2) = \{c_1(2), c_2(2), \ldots, c_6(2)\} \quad (3)$$
$$= \{[f_1, f_2], [f_2, f_3], [f_3, f_4],$$
$$[f_4, f_1], [f_1, f_4], [f_2, f_4]\}.$$

$$C_F(3) = \{c_1(3), c_2(3), \ldots, c_6(3)\} \quad (4)$$
$$= \{[f_1 \quad f_2 \quad f_3], [f_2 \quad f_3 \quad f_4],$$
$$[f_3 \quad f_4 \quad f_1], [f_4 \quad f_1 \quad f_2]\}.$$

$$C_F(4) = \{c_1(4)\} \quad (5)$$
$$= \{[f_1, f_2, f_3, f_4]\}.$$

For each set $C_F(p)$, subsets $C_{F,S}(p) \subset C_F(p)$ are defined, such that $C_{F,S}(p)=\{c_{s,1}(p), \ldots, c_{s,J_p}(p)\}$ and $J_p$ is the size of the subset ($J_p$ is less than or equal to the size of $C_F(p)$).

Furthermore, one way of selecting the preceding matrix for W(k) is to pick a subset $C_{F,S}(p)$ for a given rank p, and then cycle through this subset as k increases. There are two options of how fast the preceding matrix changes. In the first option, the precoding matrix W(k) changes every p subcarriers within the subband. In the second option, the preceding matrix W(k) changes every subcarrier within the subband.

In another embodiment of the invention, W(k) is selected as one of the submatrices in the set $C_F(p)$, for a given rank p. And the W(k) is fixed for all the subcarriers in the subband scheduled for the UE.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein:

FIG. 2A is a two coordinate illustration of contiguous, or localized subcarrier allocation for frequency-selective multi-user scheduling and frequency diversity in OFDM;

FIG. 2B is a two coordinate illustration of distributed subcarrier allocation for frequency-selective multi-user scheduling and frequency diversity in OFDM;

FIG. 4A and FIG. 4B show an illustration of an example of pre-coding as used in a MIMO system;

DETAILED DESCRIPTION OF THE INVENTION

For easily understanding the present invention, like numbers refer to like elements throughout this specification.

Figure 1:
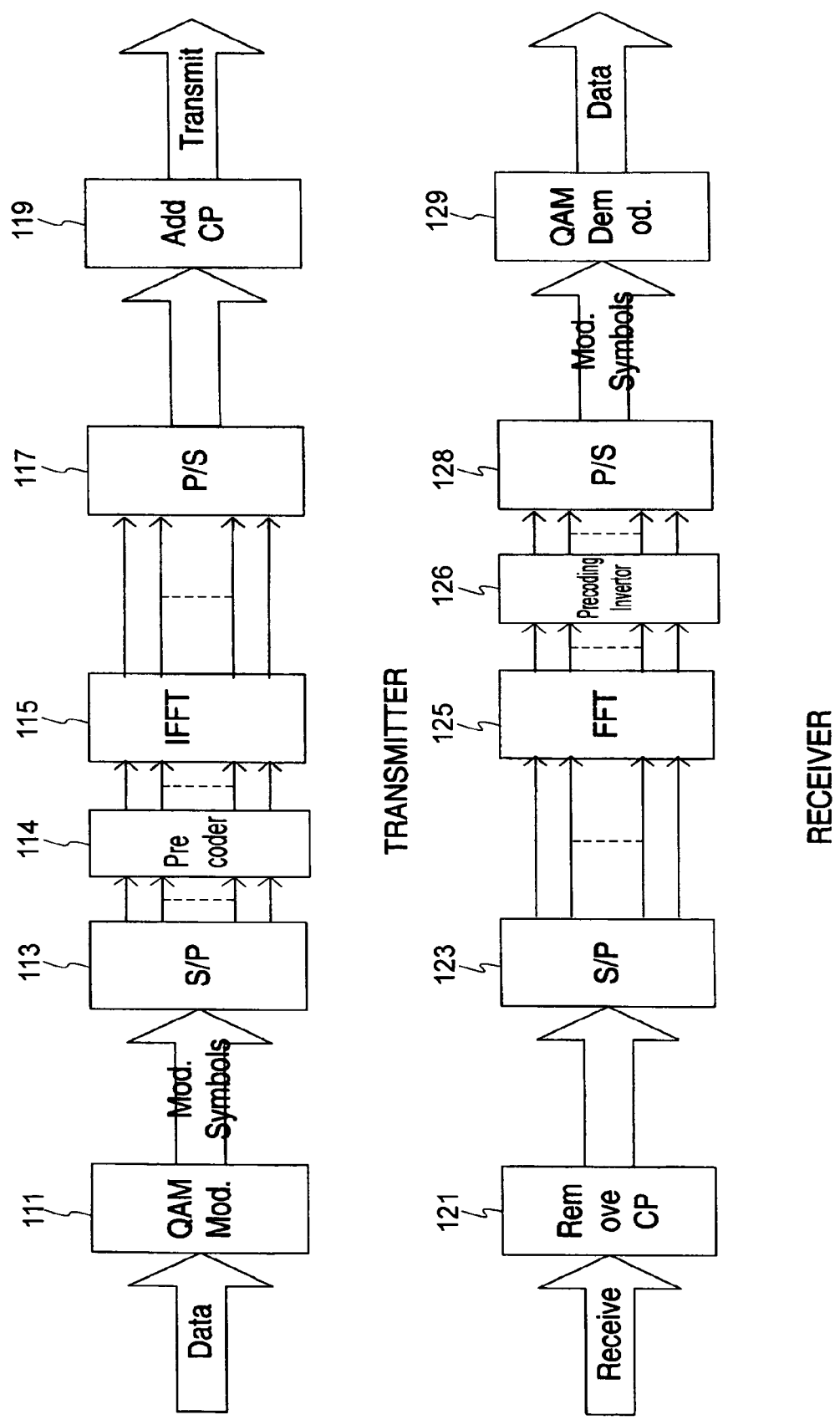
FIG. 1 is an illustration of a simplified example of data transmission and reception using Orthogonal Frequency Division Multiplexing (OFDM)

A simplified example of data transmission/reception using Orthogonal Frequency Division Multiplexing (OFDM) is shown in FIG. 1. The data to be transmitted is modulated by a quadrature amplitude modulation (QAM) modulator 111. The QAM modulated symbols are serial-to-parallel converted by a serial-to-parallel convertor 113 and input to an inverse fast Fourier transform (IFFT) unit 115. The serial-to-parallel converted modulated symbols are precoded by a precoder 114. At the output of IFFT unit 115, N time-domain samples are obtained. Here N refers to the sampling number of IFFT/FFT used by the OFDM system. The signal transmitted from IFFT unit 115 is parallel-to-serial converted by a parallel-to-serial convertor 117 and a cyclic prefix (CP) 119 is added to the signal sequence. The resulting sequence of samples is referred to as OFDM symbol. At the receiver, the cyclic prefix is firstly removed at cyclic prefix remover 121 and the signal is serial-to-parallel converted by parallel-to-serial 123 before feeding the converted parallel signal into fast Fourier transform (FFT) transformer 125. The precoded modulated symbols are decoded and recovered by a decoder 126. Output of decoder 126 is parallel-to-serial converted by parallel-to-serial convertor 128 and the resulting symbols are input to the QAM demodulator 129.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

In a communication link, a multi-path channel results in a frequency-selective fading. Moreover, in a mobile wireless environment, the channel also results in a time-varying fading. Therefore, in a wireless mobile system employing OFDM based access, the overall system performance and efficiency can be improved by using, in addition to time-domain scheduling, frequency-selective multi-user scheduling. In a time-varying frequency-selective mobile wireless channel, it is also possible to improve the reliability of the channel by spreading and/or coding the information over the subcarriers.

FIG. 2A illustrates contiguous or localized subcarrier allocation for frequency-selective multi-user scheduling and frequency diversity in OFDM, and FIG. 2B illustrates of distributed subcarrier allocation for frequency-selective multi-user scheduling and frequency diversity in OFDM.

In case of frequency-selective multi-user scheduling, a contiguous set of subcarriers potentially experiencing an upfade is allocated for transmission to a user. The total bandwidth is divided into subbands grouping multiple contiguous, or localized subcarriers as shown in FIG. 2A where subcarriers $f_1$, $f_2$, $f_3$ and $f_4$ are grouped into a subband for transmission to a user in frequency-selective multi-user scheduling mode. Upfade describes a situation where signal gains strength when signals travel from the transmitting to the receiving antenna by two or more paths.

In case of frequency-diversity transmission, the allocated subcarriers are preferably uniformly distributed over the whole spectrum as is also shown in FIG. 2B. The frequency-selective multi-user scheduling is generally beneficial for low mobility users for which the channel quality can be tracked. The channel quality can generally not be tracked for high mobility users (particularly in a frequency-division-duplex system where the fading between the downlink and uplink is independent), however, due to channel quality feedback delays and hence the frequency diversity transmission mode is preferred.

Figure 3:
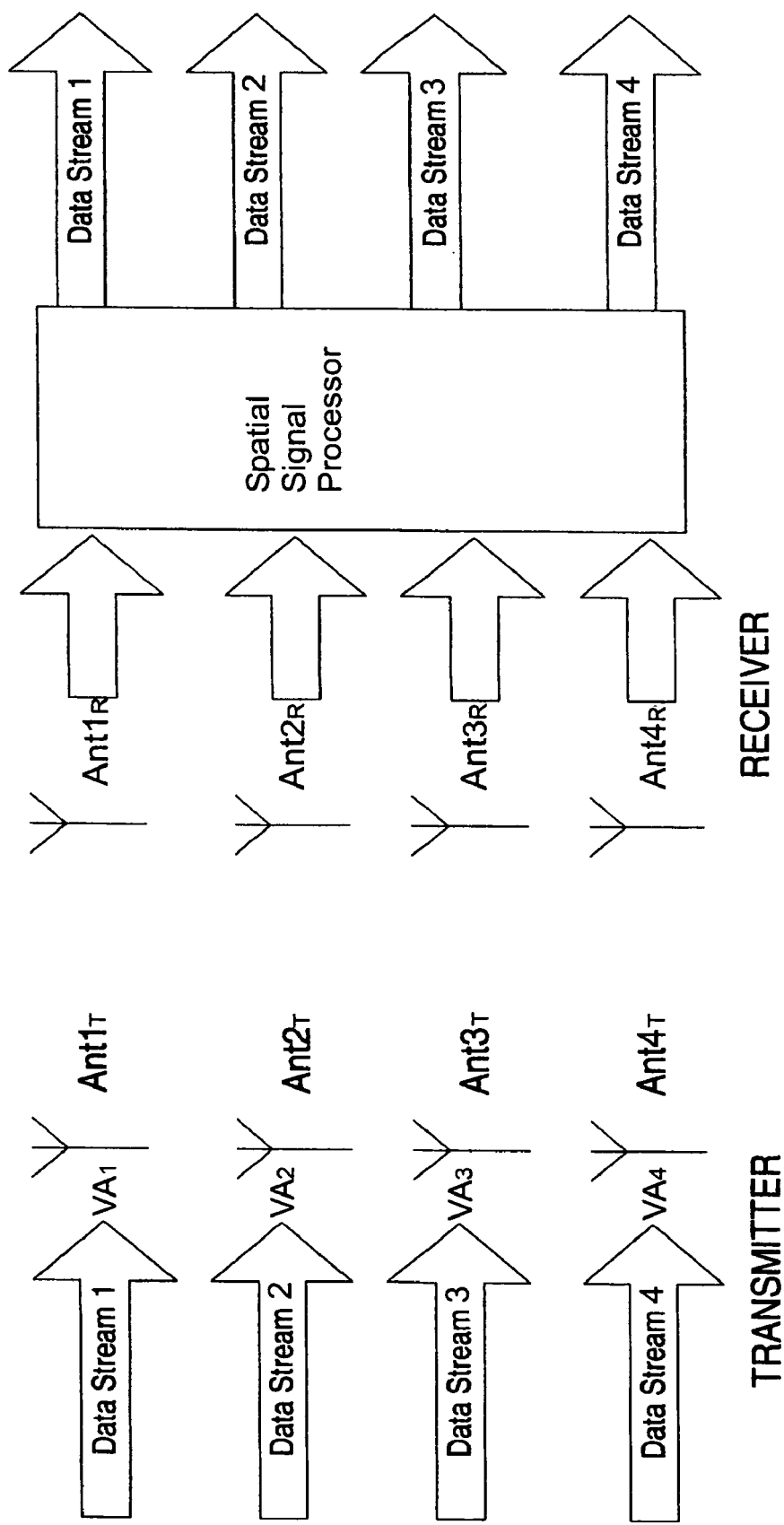
FIG. 3 is an illustration of a simplified example of a 4×4 MIMO system.

Turning now to FIG. 3, Multiple Input Multiple Output (MIMO) schemes use multiple transmitting antennas and multiple receiving antennas to improve the capacity and reliability of a wireless communication channel. A MIMO system capacity increases a function of K where K is the minimum of number of transmitting antennas (M) at transmitter and receiving antennas (N) at receiver, i.e. K=min(M,N). A simplified example of a 4×4 MIMO system is shown in FIG. 3. In this example, four different data streams Data Streams 1 to 4 are transmitted separately from the four transmitting antennas Ant$1_T$ to Ant$4_T$. The transmitted signals are received at the four receiving antennas Ant$1_R$ to Ant$4_R$. Spatial signal processing is performed on the received signals in order to recover the four data streams. An example of spatial signal processing is V-BLAST which uses the successive interference cancellation principle to recover the transmitted data streams. Other variants of MIMO schemes include schemes that perform some kind of space-time coding across the transmitting antennas (e.g. D-BLAST) and also beamforming schemes such as SDMA (Spatial Division multiple Access).

The MIMO channel estimation contemplates estimating the channel gain and phase information for links from each of the transmitting antennas to each of the receiving antennas. Therefore, the channel for M×N MIMO system uses an N×M matrix:

$$H = \begin{bmatrix} a_{11} & a_{12} & \cdots & a_{1M} \\ a_{21} & a_{22} & \cdots & a_{2M} \\ \vdots & \vdots & \cdots & \vdots \\ a_{N1} & a_{M2} & \cdots & a_{NM} \end{bmatrix} \quad (6)$$

where H is the MIMO channel matrix and $a_{ij}$ represents the channel gain from transmitting antenna j to receiving antenna i. In order to enable the estimations of the elements of the MIMO channel matrix, separate pilots are transmitted from each of the transmitting antennas.

Turning now to FIGS. 4A, 4B, an optional pre-coding scheme employs a unitary pre-coding before mapping the data streams to physical antennas as is shown in FIG. 4A and FIG. 4B. FIG. 4A shows the precoding process happening at precoder 114 at transmitter as shown in FIG. 4B. Transmitter as shown in 4B has same structure and components as the transmitter as shown in FIG. 1. A set of Virtual Antennas (VA) 411 including VA1 and VA2 is created before the pre-coding. In this case, each of the codeword is potentially transmitted from all physical transmitting antennas 413 used in the superimposed information transmission. A virtual antenna is a virtual port created by precoding matrix in front of the physical antennas. Symbols or signals transmitted over virtual antennas are mapped to multiple physical antennas. Two examples of unitary precoding matrices, $P_1$ and $P_2$ for the case of two transmitting antennas may be:

$$P_1 = \frac{1}{\sqrt{2}} \begin{bmatrix} 1 & 1 \\ 1 & -1 \end{bmatrix}, P_2 = \frac{1}{\sqrt{2}} \begin{bmatrix} 1 & 1 \\ j & -j \end{bmatrix} \quad (7)$$

Assuming modulation symbols $S_1$ and $S_2$ are transmitted at a given time from stream 1 and stream 2 respectively. Then the modulation symbols after precoding with matrix $P_1$ and $P_2$ may be written as:

$$T_1 = P_1 \begin{bmatrix} S_1 \\ S_2 \end{bmatrix} = \frac{1}{\sqrt{2}} \begin{bmatrix} 1 & 1 \\ 1 & -1 \end{bmatrix} \times \begin{bmatrix} S_1 \\ S_2 \end{bmatrix} = \frac{1}{\sqrt{2}} \begin{bmatrix} S_1 + S_2 \\ S_1 - S_2 \end{bmatrix} \quad (8)$$

$$T_2 = P_2 \begin{bmatrix} S_1 \\ S_2 \end{bmatrix} = \frac{1}{\sqrt{2}} \begin{bmatrix} 1 & 1 \\ j & -j \end{bmatrix} \times \begin{bmatrix} S_1 \\ S_2 \end{bmatrix} = \frac{1}{\sqrt{2}} \begin{bmatrix} S_1 + S_2 \\ jS_1 - jS_2 \end{bmatrix} \quad (9)$$

Therefore, symbol $$T_{11} = \frac{(S_1 + S_2)}{\sqrt{2}} \text{ and } T_{12} = \frac{(S_1 - S_2)}{\sqrt{2}}$$

will be respectively transmitted from antenna ANT$1_T$ and antenna ANT$2_T$ when precoding is done by using preceding matrix $P_1$. Similarly, symbol $$T_{21} = \frac{(S_1 + S_2)}{\sqrt{2}} \text{ and } T_{22} = \frac{(jS_1 - jS_2)}{\sqrt{2}}$$

will be respectively transmitted from antenna ANT1$_T$ and antenna ANT2$_T$ when precoding is done using precoding matrix P$_2$ as shown in FIG. 4A. It should be noted that precoding is done on an OFDM subcarrier level before the IFFT operation is performed by IFFT unit 115, as illustrated in FIG. 4A and FIG. 4B.

Figure 5A:
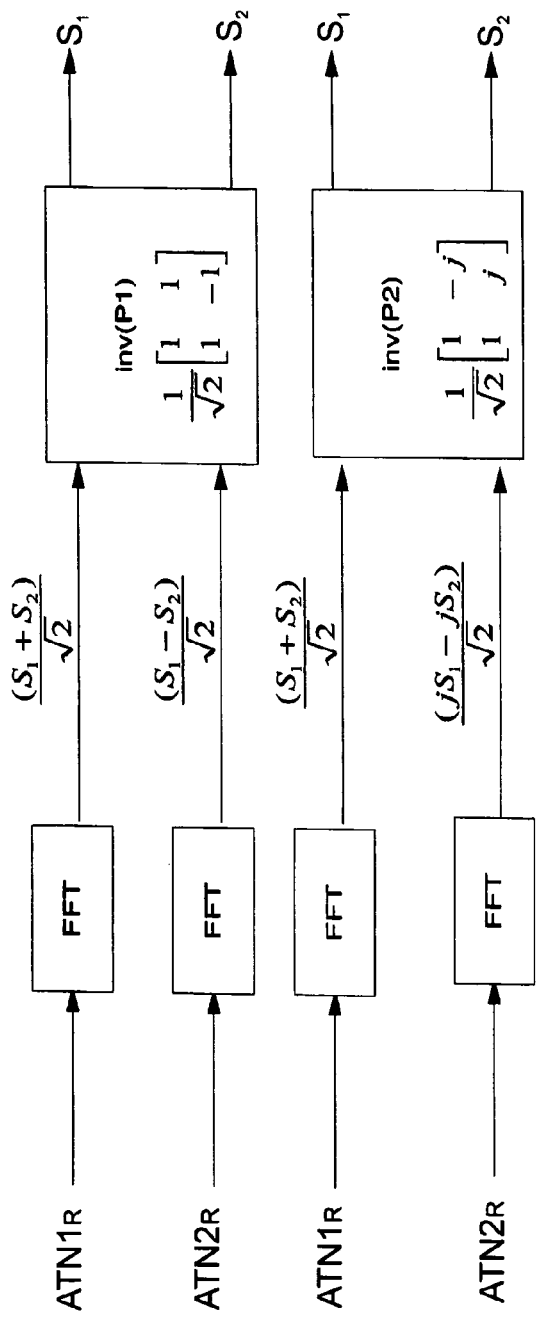
FIG. 5A and FIG. 5B show an illustration of an example of receiver processing of pre-coding as used in a MIMO system.
Figure 5B:
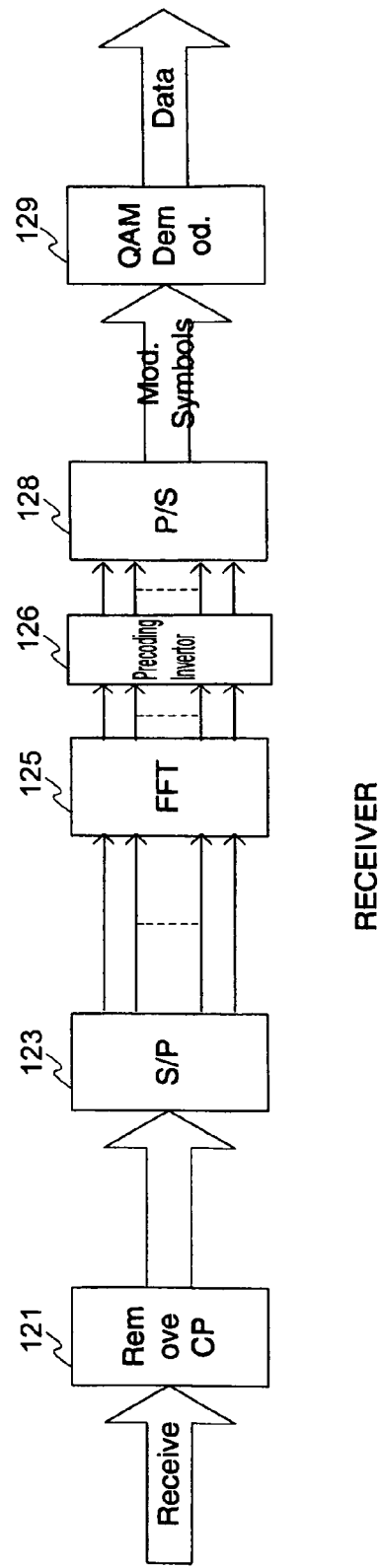

Turning now to FIG. 5A and FIG. 5B, in a pre-coded MIMO system, inverse operations are performed at the receiver as shown in FIG. 5B to recover the transmitted symbols. Receiver as shown in 5B has same structure and components as the receiver as shown in FIG. 1. Precoding reverting process as shown in FIG. 5A happens at precoding inverter 126. The received symbols are multiplied with the inverse precoding matrices as given below.

$$inv(P_1) = \frac{1}{\sqrt{2}}\begin{bmatrix} 1 & 1 \\ 1 & -1 \end{bmatrix}, inv(P_2) = \frac{1}{\sqrt{2}}\begin{bmatrix} 1 & -j \\ 1 & j \end{bmatrix} \quad (10)$$

It should be noted that the inverse of a unitary precoding matrix can simply be obtained by taking the complex conjugate transpose of the pre-coding matrix. FIG. 5A shows the inverse precoding executed in precoding inverter 126 as shown in FIG. 5B. The symbols transmitted by physical transmitting antennas 413 including are decoded by multiplying the received symbol vector with the inverse pre-coding matrices as given below.

$$\frac{1}{\sqrt{2}}\begin{bmatrix} 1 & 1 \\ 1 & -1 \end{bmatrix} \times \frac{1}{\sqrt{2}}\begin{bmatrix} S_1 + S_2 \\ S_1 - S_2 \end{bmatrix} = \begin{bmatrix} S_1 \\ S_2 \end{bmatrix} \quad (11)$$

$$\frac{1}{\sqrt{2}}\begin{bmatrix} 1 & -j \\ 1 & j \end{bmatrix} \times \frac{1}{\sqrt{2}}\begin{bmatrix} S_1 + S_2 \\ jS_1 - jS_2 \end{bmatrix} = \begin{bmatrix} S_1 \\ S_2 \end{bmatrix} \quad (12)$$

In the prior art, a precoding approach is applied to both transmit diversity and MIMO spatial multiplexing. A composite precoder is constructed based on a unitary precoder such as Fourier matrix precoder multiplied with another unitary precoder representing a transmit diversity scheme such as cyclic delay diversity. It should be noted that the principles of the current invention also applies to the cases of non-unitary precoding or unitary precoders other than Fourier matrix precoder.

A Fourier matrix is a N×N square matrix with entries given by:

$$P_{mn} = e^{j2\pi mn/N} \, m,n = 0, 1, \ldots (N-1) \quad (13)$$

A 2×2 Fourier matrix can be expressed as:

$$P_2 = \begin{bmatrix} 1 & 1 \\ 1 & e^{j\pi} \end{bmatrix} \quad (14)$$

$$= \begin{bmatrix} 1 & 1 \\ 1 & -1 \end{bmatrix}$$

Similarly, a 4×4 Fourier matrix can be expressed as:

$$P_4 = \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix} = \begin{bmatrix} 1 & 1 & 1 & 1 \\ 1 & j & -1 & -j \\ 1 & -1 & 1 & -1 \\ 1 & -j & -1 & j \end{bmatrix} \quad (15)$$

Multiple precoding matrices may be defined by introducing a shift parameter (g/G) in the Fourier matrix as given by:

$$P_{mn} = e^{j2\pi m\left(n + \frac{g}{G}\right)} , n = 0, 1, \ldots (N-1), \quad (16)$$

Here, G denotes a shift value.

A set of four 2×2 Fourier matrices can be defined by taking G=4. These four 2×2 matrices with g=0, 1, 2 and 3 are written as:

$$P_2^0 = \begin{bmatrix} 1 & 1 \\ 1 & -1 \end{bmatrix} P_2^1 = \begin{bmatrix} 1 & 1 \\ e^{j\pi/4} & -e^{j\pi/4} \end{bmatrix} \quad (17)$$

$$P_2^2 = \begin{bmatrix} 1 & 1 \\ e^{j\pi/2} & e^{j3\pi/4} \end{bmatrix} P_2^3 = \begin{bmatrix} 1 & 1 \\ e^{j3\pi/4} & -e^{j3\pi/4} \end{bmatrix}$$

A cyclic delay diversity scheme can be implemented in the frequency domain with a phase shift of $e^{j\Phi_i k}$ applied to subcarrier k transmitted from the ith transmitting antenna. The angle $$\varphi_i = \frac{2\pi}{N} D_i \quad (18)$$

where $D_i$ is the value of cyclic delay in samples applied from the ith antenna.

Figure 6:
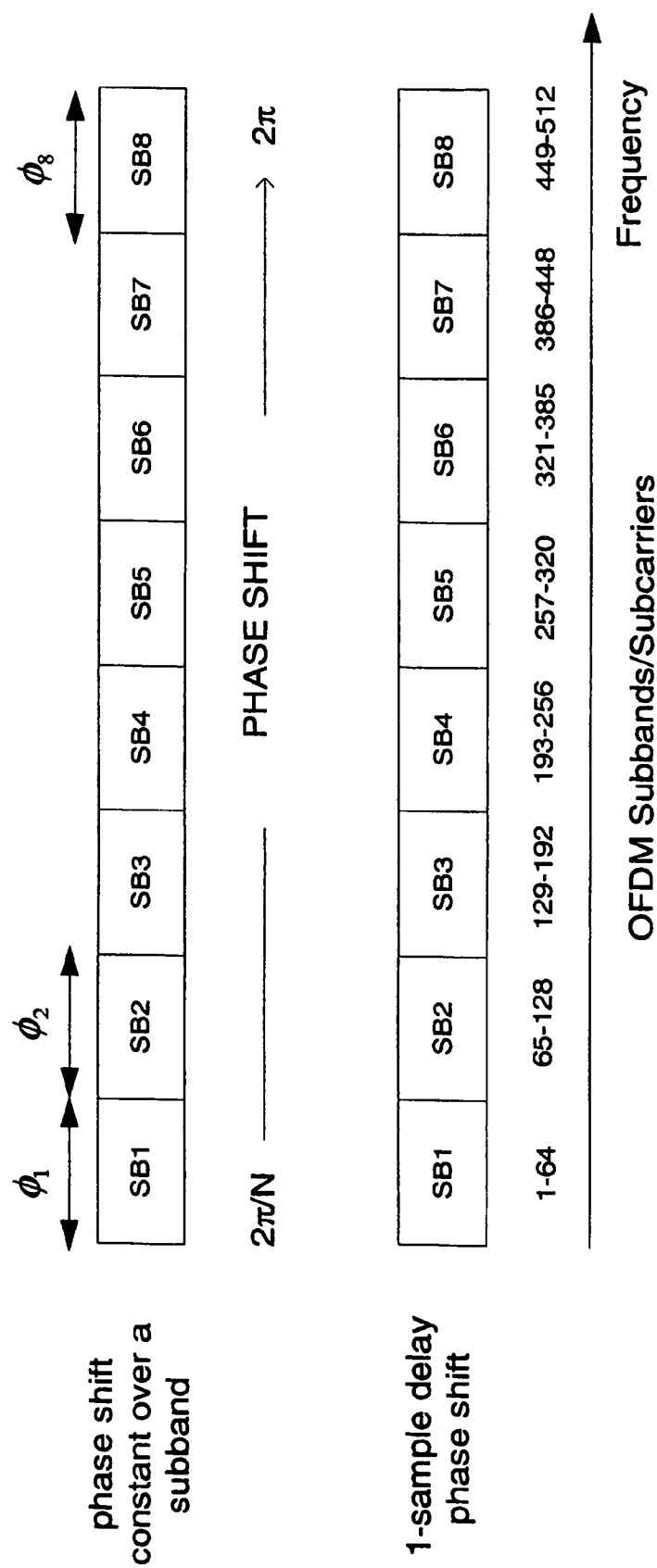
FIG. 6 is an illustration of an example of phase shift applied to subcarriers.

It should be noted that other functions can be used to derive the frequency domain phase shift. As shown in FIG. 6, it is also possible to keep the phase shift constant for a group of subcarriers and allowed to vary from one group of subcarriers to the next group. In FIG. 6, SB1 through SB8 present eight subbands. Phase shifts $\Phi_1$ through $\Phi_8$ present constant phase shift value for SB1 through SB8 respectively. For example, a total phase shift is 2π for a subband and the phase shift for each subcarrier is 2π/8. The number of subbands in FIG. 6 may be numbers other than eight.

The cyclic delay diversity can be seen as precoding with precoding matrix D$_4$ as shown in equation (19) for the case of four transmitting antennas:

$$D_4 = \begin{bmatrix} 1 & 0 & 0 & 0 \\ 0 & e^{j\phi_1 k} & 0 & 0 \\ 0 & 0 & e^{j\phi_2 k} & 0 \\ 0 & 0 & 0 & e^{j\phi_3 k} \end{bmatrix} \quad (19)$$

Figure 7:
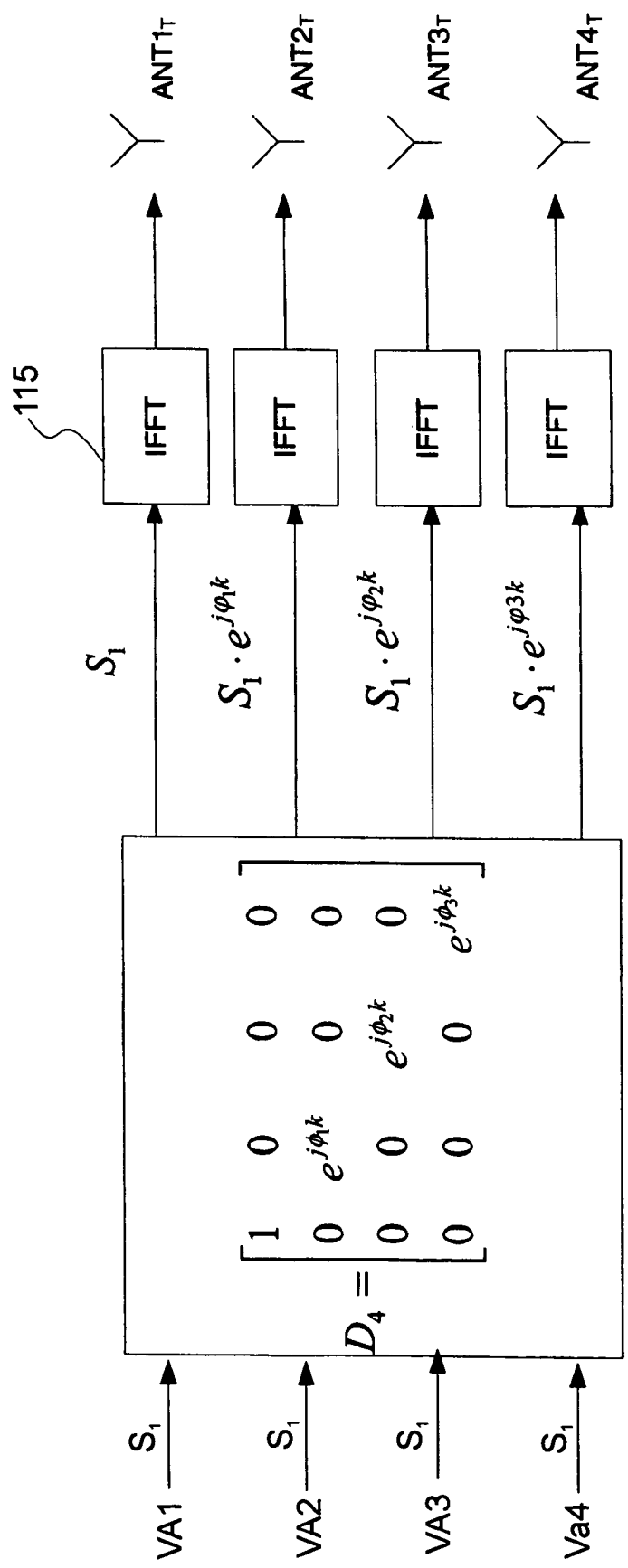
FIG. 7 is an illustration of cyclic delay diversity (CDD) procoding.

FIG. 7 illustrate cyclic delay diversity (CDD) procoding. As shown in FIG. 7, symbol S1 with antenna and frequency (subcarrier) dependent phase shifts are transmitted from multiple antennas VA1-VA4. No phase shift is applied for the symbol transmitted from the first antenna ANT1$_T$. In FIG. 7, a symbol $S_1$ is selected as a sample symbol among multiple symbols to show the phase shift at different antennas. $S_1$ has no phase shift at antenna $ANT1_T$, while $S_1$ different phase shifts at the second antenna $ANT2_T$ through the forth antenna $ANT4_T$ by multiplying $e^{j\Phi_1 k}$, $e^{j\Phi_2 k}$ and $e^{j\Phi_3 k}$ respectively.

The Fourier matrix precoding may be combined with the CDD precoding to generate a composite precoder C for the four transmitting antennas case as below:

$$C = D \times P = \begin{bmatrix} 1 & 0 & 0 & 0 \\ 0 & e^{j\phi_1 k} & 0 & 0 \\ 0 & 0 & e^{j\phi_2 k} & 0 \\ 0 & 0 & 0 & e^{j\phi_3 k} \end{bmatrix} \times \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix} \quad (20)$$

$$= \begin{bmatrix} 1 & 1 & 1 & 1 \\ e^{j\phi_1 k} & e^{j(\pi/2+\phi_1 k)} & e^{j(\pi+\phi_1 k)} & e^{j(3\pi/2+\phi_1 k)} \\ e^{j\phi_2 k} & e^{j(\pi+\phi_2 k)} & e^{j(2\pi+\phi_2 k)} & e^{j(3\pi+\phi_2 k)} \\ e^{j\phi_3 k} & e^{j(3\pi/2+\phi_3 k)} & e^{j(3\pi+\phi_3 k)} & e^{j(9\pi/2+\phi_3 k)} \end{bmatrix}$$

where cyclic delay diversity precoding matrix D is matrix $D_4$ and Fourier matrix P is matrix $P_4$ for this four transmitting antennas transmitter.

The order of matrix D and matrix P in this multiplication may be exchanged and thus resulting in a transpose of matrix C (i.e. $C^T$) as given in equation (21). Since a cyclic time delay (or an equivalent frequency shift) precoding is a component of combined matrix C, the physical antennas are delayed when matrix C is used as a precoding matrix, and the virtual antennas are delayed when matrix $C^T$ is used. When symbol $S_1$ is input into the precoder, the virtual antennas need to be delayed relatively to each other in order to introduce frequency selectivity. When a single symbol is input into the precoder, the symbol is multiplied with a weight vector w, and weight vector w should not be orthogonal to any row of precoder C. For example, when vector w is selected as $[1111]^T$ which is equal to the first row of precoder C, the vector is orthogonal to the other rows. Therefore, $[1111]^T$ cannot be selected as vector w. When multiple symbols are input into the precoder through multiple antennas respectively, each physical antenna needs to be delayed according to the corresponding symbol since one symbol is transmitted by one virtual antenna.

$$C^T = P \times D = \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix} \times \begin{bmatrix} 1 & 0 & 0 & 0 \\ 0 & e^{j\phi_1 k} & 0 & 0 \\ 0 & 0 & e^{j\phi_2 k} & 0 \\ 0 & 0 & 0 & e^{j\phi_3 k} \end{bmatrix} \quad (21)$$

$$= \begin{bmatrix} 1 & e^{j\phi_1 k} & e^{j\phi_2 k} & e^{j\phi_3 k} \\ 1 & e^{j(\pi/2+\phi_1 k)} & e^{j(\pi+\phi_2 k)} & e^{j(3\pi/2+\phi_3 k)} \\ 1 & e^{j(\pi+\phi_1 k)} & e^{j(2\pi+\phi_2 k)} & e^{j(3\pi+\phi_3 k)} \\ 1 & e^{j(3\pi/2+\phi_1 k)} & e^{j(3\pi+\phi_2 k)} & e^{j(9\pi/2+\phi_3 k)} \end{bmatrix}$$

Figure 8:
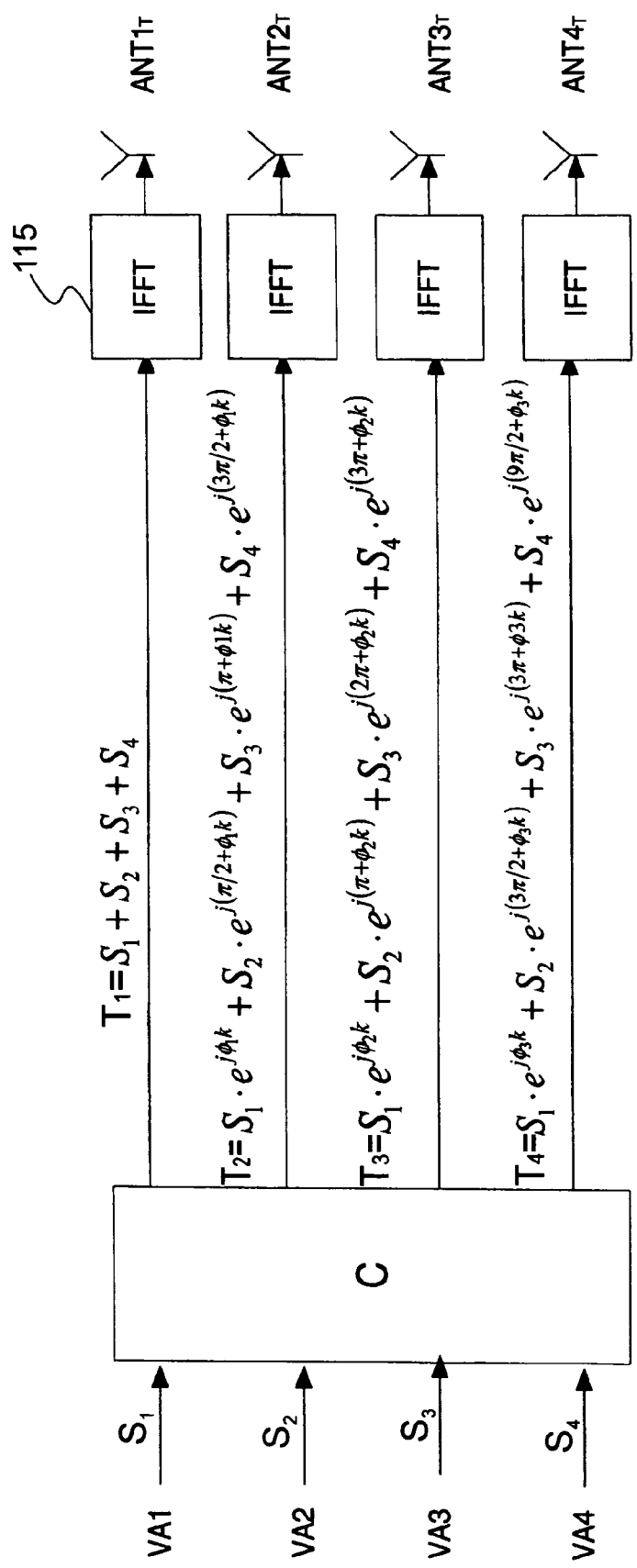
FIG. 8 is an illustration of precoding with a composite matrix C used for spatial multiplexing of four data streams in a 4×4 MIMO system.

Turing now to FIG. 8, in the case of spatial multiplexing of four streams in a 4×4 system, symbol column matrix S is multiplied by the composite preceding matrix C to get a symbol column vector T (i.e. $[T_1, T_2, T_3, T_4]^T$) transmitted from the physical antennas. FIG. 8 illustrates a precoding by composite matrix C for spatial multiplexing of four streams $S_1, S_2, S_3$ and $S_4$ in a 4×4 MIMO (i.e., 4 transmitting antennas and 4 receiving antennas) system.

$$\begin{bmatrix} T_1 \\ T_2 \\ T_3 \\ T_4 \end{bmatrix} = C \times S = \begin{bmatrix} 1 & 1 & 1 & 1 \\ e^{j\phi_1 k} & e^{j(\pi/2+\phi_1 k)} & e^{j(\pi+\phi_1 k)} & e^{j(3\pi/2+\phi_1 k)} \\ e^{j\phi_2 k} & e^{j(\pi+\phi_2 k)} & e^{j(2\pi+\phi_2 k)} & e^{j(3\pi+\phi_2 k)} \\ e^{j\phi_3 k} & e^{j(3\pi/2+\phi_3 k)} & e^{j(3\pi+\phi_3 k)} & e^{j(9\pi/2+\phi_3 k)} \end{bmatrix} \times \begin{bmatrix} S_1 \\ S_2 \\ S_3 \\ S_4 \end{bmatrix} \quad (22)$$

$$\begin{bmatrix} T_1 \\ T_2 \\ T_3 \\ T_4 \end{bmatrix} = \begin{bmatrix} S_1 + S_2 + S_3 + S_4 \\ S_1 \cdot e^{j\phi_1 k} + S_2 \cdot e^{j(\pi/2+\phi_1 k)} + S_3 \cdot e^{j(\pi+\phi_1 k)} + S_4 \cdot e^{j(3\pi/2+\phi_1 k)} \\ S_1 \cdot e^{j\phi_2 k} + S_2 \cdot e^{j(\pi+\phi_2 k)} + S_3 \cdot e^{j(2\pi+\phi_2 k)} + S_4 \cdot e^{j(3\pi+\phi_2 k)} \\ S_1 \cdot e^{j\phi_3 k} + S_2 \cdot e^{j(3\pi/2+\phi_3 k)} + S_3 \cdot e^{j(3\pi+\phi_3 k)} + S_4 \cdot e^{j(9\pi/2+\phi_3 k)} \end{bmatrix} \quad (23)$$

In the case of 2Tx antennas and ($\phi_1=\pi$, and P is a DFT matrix, the combined matrix C becomes column permutation on alternative subcarriers as follows:

$$C = DP_2 = \begin{bmatrix} 1 & 0 \\ 0 & e^{j\phi_1 k} \end{bmatrix} \begin{bmatrix} 1 & -1 \\ 1 & 1 \end{bmatrix} = \begin{bmatrix} 1 & -1 \\ e^{j\phi_1 k} & e^{j\phi_1 k} \end{bmatrix}. \quad (24)$$

Here, 2Tx indicates two transmitting antennas structure transmitter.

In case of 4Tx antennas and with a further restriction of $\phi_1=\pi/2$, $\phi_2=2\phi_1$, $\phi_3=3\phi_1$, precoding matrix C is again a column permutation matrix as follows:

$$C = D \times P = \begin{bmatrix} 1 & 1 & 1 & 1 \\ e^{j\frac{\pi}{2}k} & e^{j\frac{\pi}{2}(1+k)} & e^{j\frac{\pi}{2}(2+k)} & e^{j\frac{\pi}{2}(3+k)} \\ e^{j\pi k} & e^{j\pi(1+k)} & e^{j\pi(2+k)} & e^{j\pi(3+k)} \\ e^{j\frac{3\pi}{2}k} & e^{j\frac{3\pi}{2}(1+k)} & e^{j\frac{3\pi}{2}(2+k)} & e^{j\frac{3\pi}{2}(3+k)} \end{bmatrix} \quad (25)$$

Here, 4Tx indicates four transmitting antennas structure transmitter.

For a large-delay CDD, precoding for spatial multiplexing may be done according to following equation:

$$y(k)=D(k)Ps(k). \quad (26)$$

where D(k) is a $N_t \times N_t$ matrix ($N_t$ denotes the number of transmitting antennas), P is 4×p matrix, s(k) is symbols to be precoded and y(k) is precoded symbols.

Precoding CDD Structure for 2Tx and 4Tx Antennas

Figure 9:
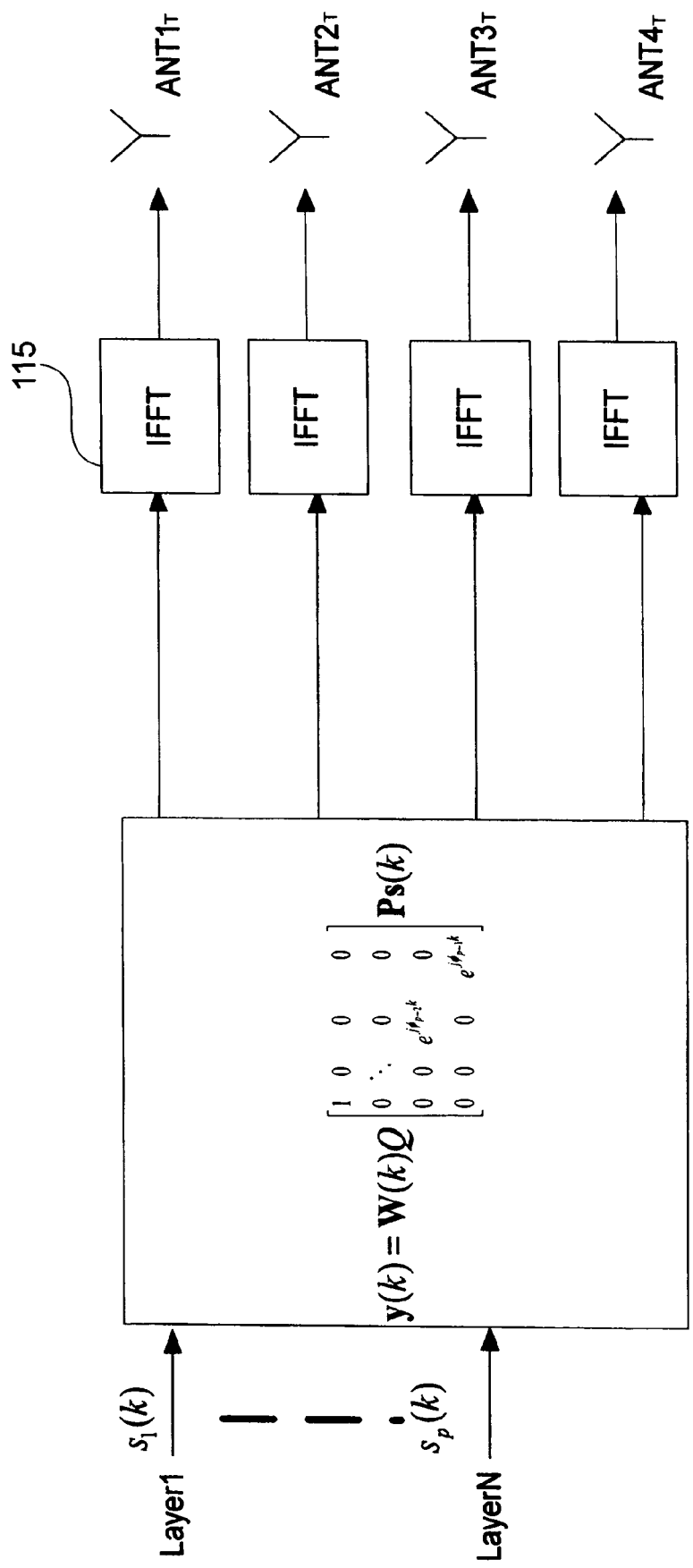
FIG. 9 is an illustration of a transmission rank adapted spatial multiplexing method using cyclic delay diversity (CDD) precoding.

FIG. 9 illustrates an alternative precoding CDD structure is proposed in documents R1-072461 and R1-072019 of "3GPP TSG-RAN WG1 #49". In this structure, large-delay CDD is applied in conjunction with the precoding matrix, if a feedback of PMI (preceding matrix indication) is available. For large-delay CDD with PMI feedback, the codebook shall be selected from the single user MIMO (SU-MIMO) codebook or a subset thereof. Therefore, for large-delay CDD, precoding for spatial multiplexing shall be done according to equation (27) as follows:

$$y(k)=W(k)QD(k)Ps(k) \quad (27)$$

where a precoding matrix W(k) is selected from the codebook having a size of N×p. Note that k is the subcarrier index, $N_t$ is the number of antenna ports and p is the transmission rank. Fourier matrix P and D(k) are of size p×p, and precoding matrix W(k) is a $N_t \times p$ matrix. Precoder Q could be in several different forms, and s(k) is the symbols to be precoded and y(k) is the precoded symbols. Two examples of Q is Q=I where I is the p×p identity matrix (in this case Q can be removed), or $Q=P^{-1}$ which is the inverse matrix of P.

Note that the number of layers is equal to the transmission rank p in case of spatial multiplexing. Fourier matrix P may be defined as follows:

$$P_{mn}=\exp(-j2\pi mn/p) \text{ for } m=0, 1, \ldots p-1 \text{ and } n=0, 1, \ldots p-1. \quad (28)$$

Cyclic delay diversity precoder D(k) shall be selected from Table 1.

TABLE 1

Large-delay cyclic delay diversity with PMI feedback

| Number of antenna port $N_t$ | Transmission rank p | D(k) | $\delta$ Large delay |
|---|---|---|---|
| 1 | 1 | — | — |
| 2 | 1 | [1] | 0 |
| 2 | 2 | $\begin{bmatrix} 1 & 0 \\ 0 & e^{-j2\pi\cdot k\cdot\delta} \end{bmatrix}$ | 1/2 |
| 4 | 1 | [1] | 0 |
| 4 | 2 | $\begin{bmatrix} 1 & 0 \\ 0 & e^{-j2\pi\cdot k\cdot\delta} \end{bmatrix}$ | 1/2 |
| 4 | 3 | $\begin{bmatrix} 1 & 0 & 0 \\ 0 & e^{-j2\pi\cdot k\cdot\delta} & 0 \\ 0 & 0 & e^{-j2\pi\cdot k\cdot 2\delta} \end{bmatrix}$ | 1/3 |
| 4 | 4 | $\begin{bmatrix} 1 & 0 & 0 & 0 \\ 0 & e^{-j2\pi\cdot k\cdot\delta} & 0 & 0 \\ 0 & 0 & e^{-j2\pi\cdot k\cdot 2\delta} & 0 \\ 0 & 0 & 0 & e^{-j2\pi\cdot k\cdot 3\delta} \end{bmatrix}$ | 1/4 |

FIG. 9 shows a transmission rank adapted spatial multiplexing method. Symbol s(k) having symbol vectors $s_1(k)$ to $s_p(k)$ carried by system layers 1 to N*p are precoded by procoding matrix W(k), Q and P. The precoding matrix W(k) is a channel dependent precoder which is dependent upon a feedback of PMI (preceding matrix indication). Fourier matrix P may be defined as follows:

$$P_{mn}=\exp(-j2\pi mn/p) \text{ for } m=0, 1, \ldots p-1 \text{ and } n=0, 1, \ldots p-1 \quad (29)$$

Precoding matrix Q may be in several different forms. Two examples of Q is Q=I where I is p×p identity matrix (in this case Q can be removed), or $Q=P^{-1}$ which is the inverse matrix of P. Cyclic delay diversity precoding matrix D(k) is provided as:

$$D = \begin{bmatrix} 1 & 0 & 0 & 0 \\ 0 & \ddots & 0 & 0 \\ 0 & 0 & e^{j\phi_{p-2}k} & 0 \\ 0 & 0 & 0 & e^{j\phi_{p-1}k} \end{bmatrix}. \quad (30)$$

The precoded symbols y(k) are transformed by inverse fast Fourier transform (IFFT) unit 115 and transmitted by transmitters $ANT1_T$ to $ANT4_T$.

In this precoding CDD method, it is assumed that matrix W(k) is chosen according the PMI, which is obtained from uplink feedback. The uplink feedback refers to the feedback signal transmitted from the mobile receiver. PMI is defined as "preceding matrix index", and is used in the 3GPP LTE RAN1 discussion to indicate the choice of the codeword within a codebook, and this choice is being feedback from the mobile to the basestation. Once a PMI is obtained for a subband, the same choice of preceding matrix W(k) is applied throughout this subband. That is, W(k) maintains the same within the same subband. In high speed scenarios, however, the PMI feedback is not reliable and the PMI in the feedback cannot be used. This system is defined as an open-loop mode. It was not clear how to select precoder W(k) in this open-loop system case. On the assumption that there is a system codebook $C_U(P)=\{c_1(p), \ldots, c_{N_p}(p)\}$, the PMI feedback by the User Equipment (UE) on subcarrier k is used to pick one code-word out of a number of $N_p$ code-words, and the selection of this codeword on subcarrier k is called precoding matrix W(k).

In this invention, several improved methods of selecting preceding matrix W(k) for high-speed open-loop precoding CDD are proposed for various antenna correlation configurations.

In one embodiment of the current invention, W(k) is selected according to a feedback without preceding matrix index (PMI) in the uplink for each given UE, and this feedback is different from the dynamic PMI. Same W(k) is applied to the UE across the scheduled subband. This method is especially useful in the configuration where the Node-B antennas are highly correlated.

Selection Based on SU-MIMO Codebook

In another embodiment of the current invention, the SU-MIMO codebook is denoted as $C_U(p)$, for a given transmission rank p that may be 1, 2, 3 or 4. The size of the codebook for rank p is denoted by $N_p$. Codewords $c_i(p)$ are denoted in the code book as equation (31):

$$C_U(p)=\{c_1(p), \ldots, c_{N_p}(p)\}, i=1, \ldots, N_p. \quad (31)$$

Note that $c_i(p)$ is a G×p matrix.

The codebook is predetermined in the standard in a matrix form.

Furthermore, one way of selecting preceding matrix W(k) for rank p is to cycle through the codebook $C_U(p)$ as k increases. There are two options of how fast the precoding matrix may change. A "code book" is a set of predetermined reference data from which a precoder is selected when a predetermined situation is met. A "code word" refers to each data in a code book.

Figure 10:
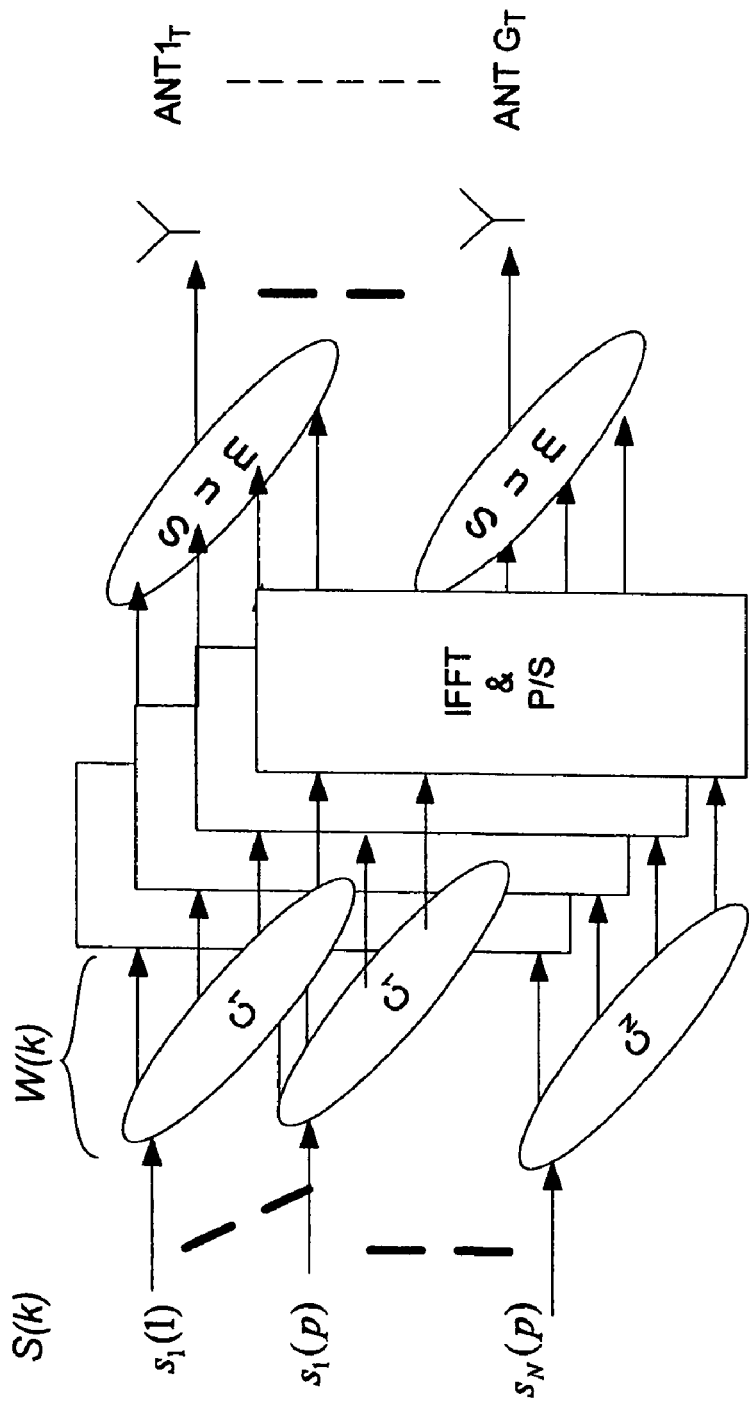
FIG. 10 is an illustration of a method to change precoders for each subcarrier for the practice of the principles of the present inventions.

FIG. 10 illustrates the first option of how fast the precoding matrix changes. The symbol s(k) to be precoded includes symbol vectors $s_1(1), s_1(2), \ldots, s_1(p)$ (which is signal to be transmitted on the first groups of subcarriers), $s_2(1), \ldots, s_2(p)$, (which is signal to be transmitted on the second group of subcarriers), $\ldots, s_N(1), \ldots,$ and $s_N(p)$ (which is signal to be transmitted on N-th group subcarriers). Note each group comprises of p subcarriers, and there are a total of N groups, and thus the total number of subcarriers is $N_{sub}=N*p$. Precoding matrix W(k) may change every p subcarriers within a subband. For example, transmission rank adapted symbol vectors $s_1(1)$ to $s_1(p)$ are precoded by the same precoding matrix W(k) which is shown as $C_1$, transmission rank adapted symbol vectors $s_2(1)$ to $s_2(p)$ are precoded by the same precoding matrix W(k) which is $C_2$ (not shown in FIG. 10), and the transmission rank adapted symbol vectors $s_N(1)$ to $s_N(p)$ are precoded by the same procoding matrix $C_N$. The precoded transmission rank adapted symbol vectors are then processed by IFFT unit and P/S unit in their corresponding transmission ranks, are summarized and transmitted to their corresponding transmitting antennas. Here, $ANTG_T$ indicates #G transmitting antenna. Mathematically, for any subcarrier k that satisfies $1 \leq k \leq N_{sub}$ where $N_{sub}$ is the total number of subcarriers in the sub-band scheduled for the UE, precoding matrix satisfies equation (32):

$$W(k) = \begin{cases} c_1(p), & \text{if } \mod\left(\left\lceil \frac{k+a}{p} \right\rceil, N_p\right) = 1 \\ c_2(p), & \text{if } \mod\left(\left\lceil \frac{k+a}{p} \right\rceil, N_p\right) = 2 \\ \vdots \\ c_{N_p}(p), & \text{if } \mod\left(\left\lceil \frac{k+a}{p} \right\rceil, N_p\right) = 0 \end{cases} \quad (32)$$

where $N_p$ is the size of codebook.

Note that "a" is a constant shift, and a typical value of "a" is 0. Also note that mod( ) is the modulo operation and ⌈ ⌉ is the ceiling operation.

Figure 11:
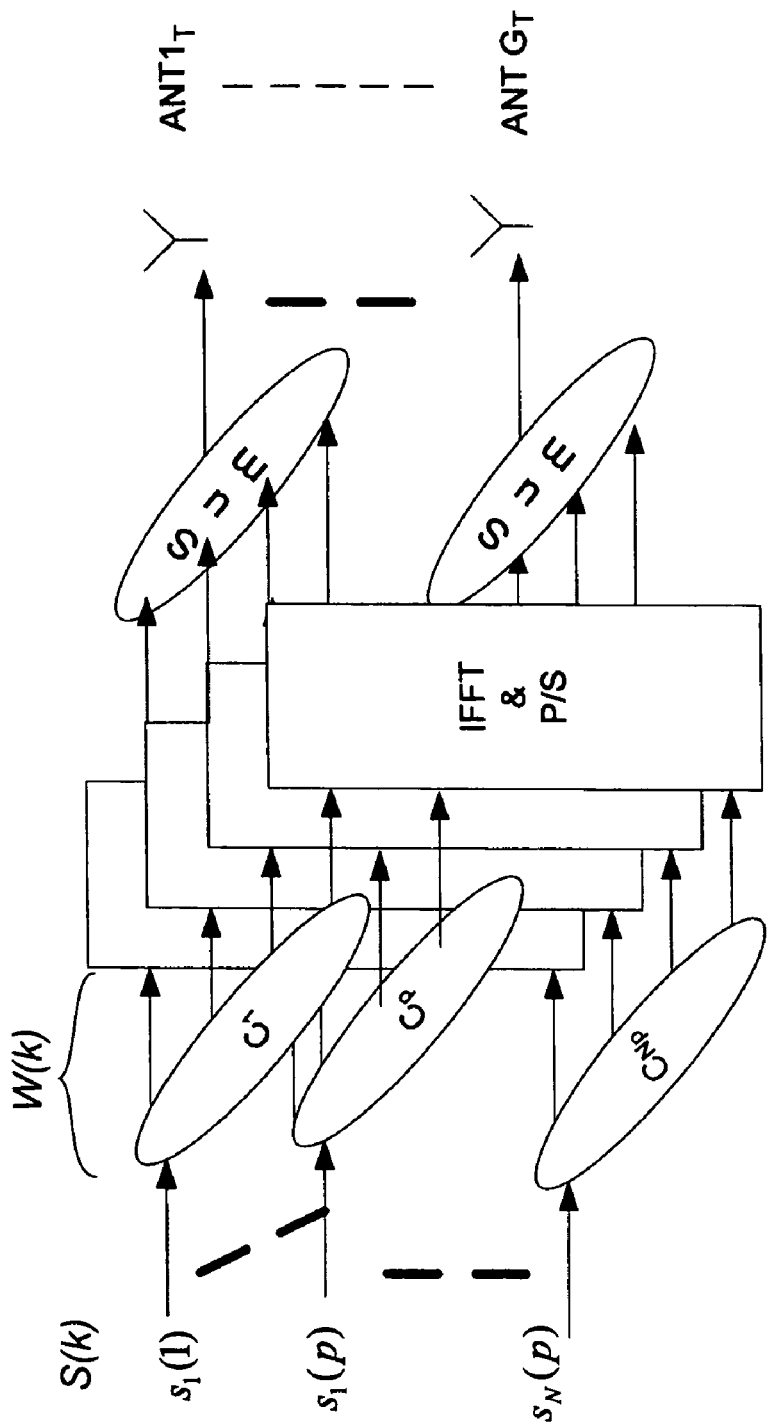
FIG. 11 is an illustration of another method to change precoders each subcarrier or the practice of the principles of the present inventions.

The second option is as shown in FIG. 11. The symbol s(k) to be precoded includes symbol vectors $s_1(1), s_1(2), \ldots, s_1(p), s_2(1), \ldots, s_2(p), \ldots, \ldots, s_N(1), \ldots$, and $s_N(p)$. The precoding matrix W(k) changes every subcarrier within the subband. For example, transmission rank adapted symbol vector $s_1(1)$ is precoded by the preceding matrix W(k) which is shown as $C_1$, transmission rank adapted symbol vectors $s_1(2)$ is precoded by the precoding matrix W(k) which is $C_2$ (not shown in FIG. 11), the transmission rank adapted symbol vectors $s_1(p)$ is precoded by the procoding matrix $C_p$, and the transmission rank adapted symbol vectors $s_N(P)$ is precoded by the procoding matrix $C_{Np}$. The precoded transmission rank adapted symbol vectors are then processed by IFFT unit and P/S unit in their corresponding transmission ranks, are summarized and transmitted to their corresponding transmitting antennas. Here, $ANTG_T$ indicates #G transmitting antenna. Mathematically, for any subcarrier k:

$$W(k) = \begin{cases} c_1(p), & \text{if } \mod(k+a, N_p) = 1 \\ c_2(p), & \text{if } \mod(k+a, N_p) = 2 \\ \vdots \\ c_{N_p}(p), & \text{if } \mod(k+a, N_p) = 0 \end{cases} \quad (33)$$

In FIGS. 10 and 11, there are a total of N*p subcarriers. In FIG. 10, the codeword changes every p subcarriers, resulting in a total of N*p/p=N codewords; and in FIG. 11, the codeword changes every subcarrier, resulting in a total of N*p/1=N*p codewords.

In another embodiment of the current invention, for each codebook $C_U(P)$, subsets $C_{U,S}(p) \subset C_U(p)$ are defined, such that $C_{U,S}(p) = \{c_{s,1}(p), \ldots, c_{s,J_p}(p)\}$ and $J_p$ is the size of the subset ($J_p$ is less than or equal to $N_p$).

Furthermore, one way of selecting the precoding matrix for W(k) is to pick a subset $C_{U,S}(p)$ for a given rank p, and then cycle through this subset as k increases. There are two options of how fast the precoding matrix changes. In the first option, the precoding matrix W(k) changes every p subcarriers within the subband, or, mathematically, for any subcarrier k that satisfies $1 \leq k \leq N_{sub}$ where $N_{sub}$ is the total number of subcarriers in the sub-band scheduled for the UE. Note that "a" is a constant shift, and a typical value of "a" is 0. Also note that mod( ) is the modulo operation and ⌈ ⌉ is the ceiling operation.

$$W(k) = \begin{cases} c_{s,1}(p), & \text{if } \mod\left(\left\lceil \frac{k+a}{p} \right\rceil, J_p\right) = 1 \\ c_{s,2}(p), & \text{if } \mod\left(\left\lceil \frac{k+a}{p} \right\rceil, J_p\right) = 2 \\ \vdots \\ c_{s,J_p}(p), & \text{if } \mod\left(\left\lceil \frac{k+a}{p} \right\rceil, J_p\right) = 0 \end{cases} \quad (34)$$

In the second option, the precoding matrix W(k) changes every subcarrier within the subband, or, mathematically, for any subcarrier k:

$$W(k) = \begin{cases} c_{s,1}(p), & \text{if } \mod(k+a, J_p) = 1 \\ c_{s,2}(p), & \text{if } \mod(k+a, J_p) = 2 \\ \vdots \\ c_{s,J_p}(p), & \text{if } \mod(k+a, J_p) = 0 \end{cases} \quad (35)$$

In another embodiment of the invention, W(k) is selected as one of the submatrices in the set $C_U(p)$, for a given rank p. And the W(k) is fixed for all the subcarriers in the subband scheduled for the UE.

Selection Based on DFT Submatrix

In another embodiment of the present invention, a 4Tx structure system will be explained as an example. This embodiment, however, is not limited to a 4Tx structure system but may be applied to NTx structure system (a system having a number of transmitters other than 4). A 4Tx DFT matrix is defined as follows:

$$F = [f_1 \; f_2 \; f_3 \; f_4] = 0.5 * \begin{bmatrix} 1 & 1 & 1 & 1 \\ 1 & j & -1 & -j \\ 1 & -1 & 1 & -1 \\ 1 & -j & -1 & j \end{bmatrix}, \quad (36)$$

Where $f_i$, i=1, ..., 4 is the i'th column of the above DFT matrix. The set of rank dependent sub-matrices $C_F(p)$ is dependent on the transmission rank p:

$$C_F(2) = \{c_1(2), c_2(2), \ldots, c_6(2)\} \quad (37)$$
$$= \{[f_1, f_2], [f_2, f_3], [f_3, f_4], [f_4, f_1], [f_1, f_4], [f_2, f_4]\}.$$

$$C_F(3) = \{c_1(3), c_2(3), \ldots, c_6(3)\} \quad (38)$$
$$= \{[f_1 \; f_2 \; f_3], [f_2 \; f_3 \; f_4], [f_3 \; f_4 \; f_1], [f_4 \; f_1 \; f_2]\}.$$

$$C_F(4) = \{c_1(4)\} \quad (39)$$
$$= \{[f_1, f_2, f_3, f_4]\}.$$

For each set $C_F(p)$, subsets $C_{F,S}(p) \subset C_F(p)$ are defined, such that $C_{F,S}(p) = \{c_{s,1}(p), \ldots, c_{s,J_p}(p)\}$ and $J_p$ is the size of the subset ($J_p$ is less than or equal to the size of $C_F(p)$). For example, one subset of the rank 2 set is $$C_{F,S}(2) = \{c_{s,1}(2), c_{s,2}(2), \ldots, c_{s,4}(2)\} \quad (40)$$
$$= \{[f_1, f_2], [f_2, f_3], [f_3, f_4], [f_4, f_1]\}.$$

Furthermore, one way of selecting the precoding matrix for W(k) is to pick a subset $C_{F,S}(p)$ for a given rank p, and then cycle through this subset as k increases. There are two options of how fast the precoding matrix changes.

In the first option, the precoding matrix W(k) changes every p subcarriers within the subband, or, mathematically, for any subcarrier k that satisfies $1 \leq k \leq N_{sub}$, where $N_{sub}$ is the total number of subcarriers in the sub-band scheduled for the UE. Note that "a" is a constant shift, and a typical value of "a" is 0. Also note that mod( ) is the modulo operation and $\lceil \ \rceil$ is the ceiling operation. "s" here indicates precoder matrix selection is among a subset of codebook. For example, $c_{s,2}(p)$ is the second code word within a subset of the codebook, this is to distinguish from $c_2(p)$ which indicates the second codeword within the original codebook.

$$W(k) = \begin{cases} c_{s,1}(p), & \text{if } \mathrm{mod}\left(\left\lceil \frac{k+a}{p}\right\rceil, J_p\right) = 1 \\ c_{s,2}(p), & \text{if } \mathrm{mod}\left(\left\lceil \frac{k+a}{p}\right\rceil, J_p\right) = 2 \\ \vdots \\ c_{s,J_p}(p), & \text{if } \mathrm{mod}\left(\left\lceil \frac{k+a}{p}\right\rceil, J_p\right) = 0 \end{cases} \quad (41)$$

In the second option, the precoding matrix W(k) changes every subcarrier within the subband, or, mathematically, for any subcarrier k:

$$W(k) = \begin{cases} c_{s,1}(p), & \text{if } \mathrm{mod}(k+a, J_p) = 1 \\ c_{s,2}(p), & \text{if } \mathrm{mod}(k+a, J_p) = 2 \\ \vdots \\ c_{s,J_p}(p), & \text{if } \mathrm{mod}(k+a, J_p) = 0 \end{cases} \quad (42)$$

As an example, in case of p=2, a=0, the subset is chosen as $$C_{F,S}(2) = \{c_{s,1}(2), c_{s,2}(2), \ldots, c_{s,4}(2)\} \quad (43)$$
$$= \{[f_1, f_2], [f_2, f_3], [f_3, f_4], [f_4, f_1]\}.$$

If the first option is adopted, where the precoding matrix changes every p=2 subcarriers, the selecting of precoding matrix W(k) becomes:

$$W(k) = \begin{cases} [f_1, f_2], & \text{if } \mathrm{mod}\left(\left\lceil \frac{k}{2}\right\rceil, 4\right) = 1 \\ [f_2, f_3], & \text{if } \mathrm{mod}\left(\left\lceil \frac{k}{2}\right\rceil, 4\right) = 2 \\ \vdots \\ [f_4, f_1], & \text{if } \mathrm{mod}\left(\left\lceil \frac{k}{2}\right\rceil, 4\right) = 0 \end{cases} \quad (44)$$

In another embodiment of the present invention, W(k) is selected as one of the submatrices in the set $C_F(p)$, for a given rank p. And the W(k) is fixed for all the subcarriers in the subband scheduled for the UE.

In another embodiment of the present invention, the preceeding embodiments mentioned above are reversible (i.e. readably decodable) with advance reception of the precoded symbols by the receiver. In other words, the precoded symbols may be decoded in likely methods at the receiver. A precoded symbol may be decoded by a selected decoding matrix, the decoding matrix is selected by cycling through a decode code-book within a subband, and the decoding matrix may either change every p subcarrier or change every subcarrier within a subband. Also, the precoded symbol may be decoded by a selected decoding matrix, the decoding matrix is selected by cycling through a subset of the decode codebook, and the decoding matrix may either change every p subcarrier or change every subcarrier within a subband.

The precoder is a part of the eNB baseband microprocessor.

What is claimed is:

1. A method for data transmission, comprising:
   selecting, at the precoder, a codeword from a predetermined codebook based on a transmission rank, wherein each codeword in the predetermined codebook is an $N_t$ by p matrix, where p is the transmission rank and $N_t$ is the number of antennas, and wherein selecting the codeword comprises selecting the codeword for the transmission rank p by cycling through the codebook in a designated subband scheduled for a User;
   generating, at the precoder, a precoding matrix based on the selected codeword;
   precoding, at the precoder, a plurality of symbols with the precoding matrix; and
   transmitting, at an RF amplifier enabling transmission stage, the precoded symbols.

2. The method of claim 1, wherein each codeword is selected consecutively for a specified number of times corresponding to the transmission rank.

3. The method of claim 1, wherein selecting the codeword further comprises changing the codeword every p number of times in the designated subband.

4. The method of claim 3, wherein the codeword, W(k), is established by:

$$W(k) = \begin{cases} c_1(p), & \text{if } \mathrm{mod}\left(\left\lceil \frac{k+a}{p}\right\rceil, N_p\right) = 1 \\ c_2(p), & \text{if } \mathrm{mod}\left(\left\lceil \frac{k+a}{p}\right\rceil, N_p\right) = 2 \\ \vdots \\ c_{N_p}(p), & \text{if } \mathrm{mod}\left(\left\lceil \frac{k+a}{p}\right\rceil, N_p\right) = 0 \end{cases},$$

where $c_i(p)$ is the i-th codeword in the codebook,
where a is a constant shift, and
where the operator mod( ) is the modulo operation and the operator $\lceil \ \rceil$ is the ceiling operation.

5. The method of claim 1, wherein selecting the codeword comprises changing the codeword every subcarrier in the designated subband.

6. The method of claim 5, wherein the codeword, W(k), is established by:

$$W(k) = \begin{cases} c_1(p), & \text{if } \mathrm{mod}(k+a, N_p) = 1 \\ c_2(p), & \text{if } \mathrm{mod}(k+a, N_p) = 2 \\ \vdots \\ c_{N_p}(p), & \text{if } \mathrm{mod}(k+a, N_p) = 0 \end{cases}.$$

7. The method of claim 1, wherein the codebook is a Discrete Fourier transform matrix.

8. The method of claim 7, wherein the codebook is a 4Tx Discrete Fourier transform matrix established by:

$$F = [f_1 \quad f_2 \quad f_3 \quad f_4] = 0.5 * \begin{bmatrix} 1 & 1 & 1 & 1 \\ 1 & j & -1 & -j \\ 1 & -1 & 1 & -1 \\ 1 & -j & -1 & j \end{bmatrix},$$

where $f_i$ is the i'th column of the Discrete Fourier transform matrix, and i is the number of the column.

9. The method of claim 8, wherein the Discrete Fourier transform matrix comprises sub-matrices $C_F(p)$ for 4Tx established by:

$$C_F(2) = \{c_1(2), c_2(2), \ldots, c_6(2)\}$$
$$= \{[f_1, f_2], [f_2, f_3], [f_3, f_4], [f_4, f_1], [f_1, f_4], [f_2, f_4]\}.$$

$$C_F(3) = \{c_1(3), c_2(3), \ldots, c_6(3)\}$$
$$= \{[f_1 \quad f_2 \quad f_3], [f_2 \quad f_3 \quad f_4], [f_3 \quad f_4 \quad f_1], [f_4 \quad f_1 \quad f_2]\}$$

$$C_F(4) = \{c_1(4)\}$$
$$= \{[f_1, f_2, f_3, f_4]\}.$$

10. The method of claim 7, wherein the codebook comprises a set of transmission rank dependent sub-matrices $C_F(p)$.

11. The method of claim 1, wherein the precoding matrix is generated based on the selected codeword, a first unitary matrix, and a second unitary matrix.

12. The method of claim 11, wherein the first unitary matrix is a Fourier matrix and the second unitary matrix is for cyclic delay diversity.

13. A transmitter for transmitting data, comprising:
a modulator configured to modulate data to be transmitted via the transmitter into a plurality of modulated symbols;
a precoder configured to select a codeword from a predetermined codebook based on a transmission rank, to generate a precoding matrix based on the selected codeword, and to precode the modulated symbols with the precoding matrix, wherein selecting the codeword comprises selecting a codeword precoding matrix W(k) for transmission rank p by cycling through the codebook with an increment of a subcarrier index in a designated subband scheduled for a User; and
an RF amplifier configured to enable transmission of the precoded modulated symbols.

14. The transmitter of claim 13, wherein each codeword in the predetermined codebook is an $N_t$ by p matrix,
where p is the transmission rank, and
where $N_t$ is a number of antennas.

15. The transmitter of claim 13, wherein selecting the codeword comprises cycling through a selection of each of the codewords in the codebook, wherein each codeword is selected consecutively for a specified number of times corresponding to the transmission rank.

16. The transmitter of claim 13, wherein the predetermined codebook is a Discrete Fourier Transform matrix codebook.

17. The transmitter of claim 16, wherein the precoder is configured to select the codeword by changing the codeword every p subcarriers in a designated subband.

18. The transmitter of claim 16, wherein the precoder is configured to select the codeword by changing the codeword every subcarrier in a designated subband.

19. The method of claim 13, wherein the precoding matrix is generated based on the selected codeword, a first unitary matrix, and a second unitary matrix.

20. The method of claim 19, wherein the first unitary matrix is a Fourier matrix and the second unitary matrix is for cyclic delay diversity.

* * * * *